United States Patent
Kauppi

(10) Patent No.: US 10,155,206 B1
(45) Date of Patent: Dec. 18, 2018

(54) MIXING APPARATUS AND ARRANGEMENT FOR INTRODUCING A FIRST LIQUID, A SECOND LIQUID, AND A THIRD LIQUID INTO A PROCESS LIQUID FLOW WHICH IS FLOWING IN A LINEAR FLOW DUCT SECTION

(71) Applicant: OUTOTEC (FINLAND) OY, Espoo (FI)

(72) Inventor: Janne Kauppi, Lappeenranta (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/781,711

(22) PCT Filed: Dec. 8, 2016

(86) PCT No.: PCT/FI2016/050854
§ 371 (c)(1),
(2) Date: Jun. 6, 2018

(87) PCT Pub. No.: WO2017/098083
PCT Pub. Date: Jun. 15, 2017

(30) Foreign Application Priority Data

Dec. 9, 2015 (FI) .................................... 20155931

(51) Int. Cl.
*B01F 5/00* (2006.01)
*B01F 5/04* (2006.01)
(Continued)

(52) U.S. Cl.
CPC .......... *B01F 5/0475* (2013.01); *B01F 3/0865* (2013.01); *B01F 5/0082* (2013.01); *B01F 5/0405* (2013.01); *B33Y 80/00* (2014.12)

(58) Field of Classification Search
CPC ...... B01F 5/0475; B01F 5/0405; B01F 5/801; B01F 5/0082; B01F 3/0865; B33Y 80/00
(Continued)

(56) References Cited

U.S. PATENT DOCUMENTS 2,361,150 A * 10/1944 Petroe .................. B01F 5/0451
137/44
4,800,921 A * 1/1989 Greebe ................... F16L 41/03
137/561 A
(Continued)

FOREIGN PATENT DOCUMENTS

DE  102011075558 A1  11/2012
GB      1446998 A     8/1976
(Continued)

OTHER PUBLICATIONS

Finnish Search Report issued by the Finnish Patent and Registration Office in relation to Finnish Application No. 20155931 dated Apr. 28, 2016 (2 pages).
(Continued)

*Primary Examiner* — Tony G Soohoo
(74) *Attorney, Agent, or Firm* — Robert P. Michal, Esq.; Carter, DeLuca, Farrell & Schmidt, LLP

(57) ABSTRACT

A mixing apparatus has a first liquid inlet conduit for a first liquid, a second liquid inlet conduit for a second liquid, a third liquid inlet conduit for a third liquid, and an outlet assembly for feeding a mixture of the first, second, and third liquid from the mixing apparatus. The outlet assembly includes a pair of first outlet openings arranged symmetrically with respect to a center plane of the outlet assembly, a second outlet opening arranged at a center plane, a pair of third outlet openings arranged symmetrically with respect to and along the center plane between the pair of identical first outlet openings and the second outlet opening.

15 Claims, 21 Drawing Sheets

(51) Int. Cl.
*B01F 3/08* (2006.01)
*B33Y 80/00* (2015.01)
(58) Field of Classification Search
USPC .......................................... 366/176.1, 173.1
See application file for complete search history.

(56) References Cited

U.S. PATENT DOCUMENTS

| | | | | |
|---|---|---|---|---|
| 7,621,670 | B1* | 11/2009 | England | B01F 5/0682 138/40 |
| 2006/0056271 | A1* | 3/2006 | Kapila | B01F 3/0865 366/181.5 |
| 2007/0253281 | A1* | 11/2007 | Radford | B01F 5/0475 366/173.1 |
| 2007/0258315 | A1* | 11/2007 | Matula | B01F 3/0865 366/134 |
| 2011/0305102 | A1* | 12/2011 | Berger | B01F 5/0405 366/154.1 |

FOREIGN PATENT DOCUMENTS

| | | |
|---|---|---|
| SU | 1487961 A1 | 6/1989 |
| WO | WO-2014068185 A1 | 5/2014 |

OTHER PUBLICATIONS

Written Opinion of the International Searching Authority issued by the European Patent Office acting as the International Searching Authority in relation to International Application No. PCT/FI2016/050854 dated Mar. 28, 2017 (8 pages).

International Search Report issued by the European Patent Office acting as the International Searching Authority in relation to International Application No. PCT/FI2016/050854 dated Mar. 28, 2017 (4 pages).

International Preliminary Report on Patentability issued by the European Patent Office acting as the International Preliminary Examining Authority in relation to International Application No. PCT/FI2016/050854 dated Nov. 23, 2017 (7 pages).

\* cited by examiner

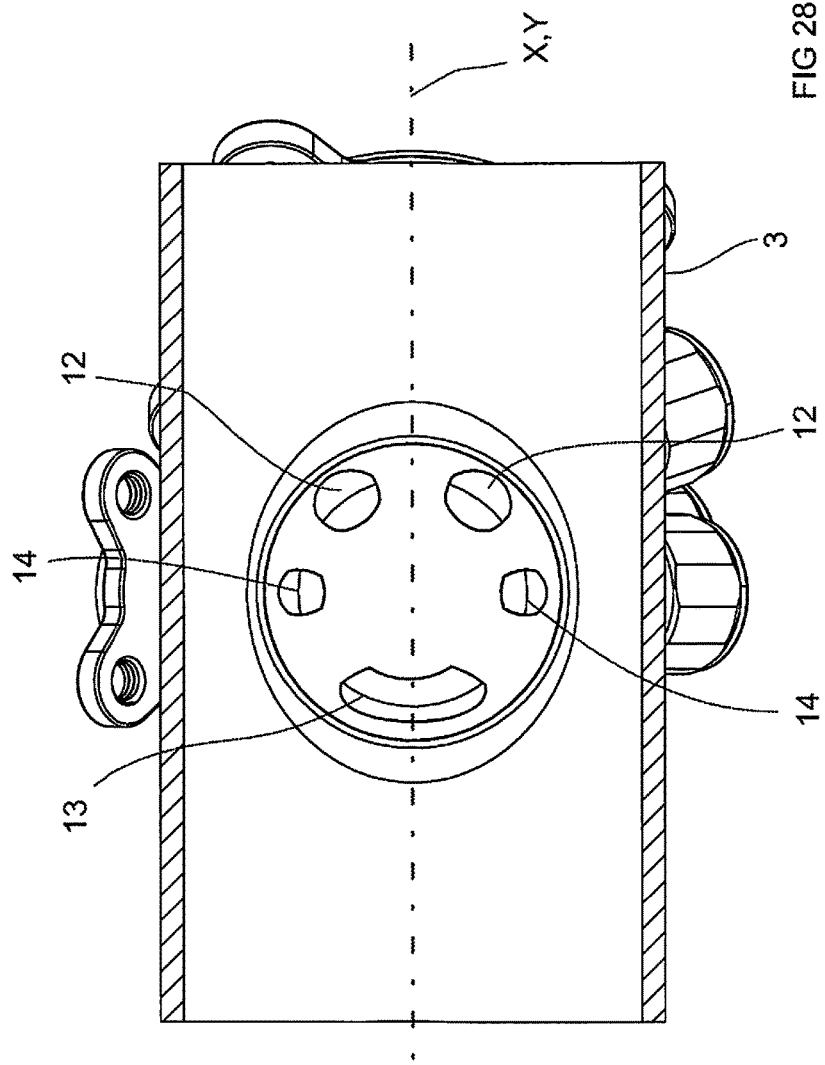

US 10,155,206 B1

MIXING APPARATUS AND ARRANGEMENT FOR INTRODUCING A FIRST LIQUID, A SECOND LIQUID, AND A THIRD LIQUID INTO A PROCESS LIQUID FLOW WHICH IS FLOWING IN A LINEAR FLOW DUCT SECTION

CROSS-REFERENCE TO RELATED APPLICATIONS

This application is a national phase entry under 35 U.S.C. 371 of PCT International Application No. PCT/FI2016/050854 filed Dec. 8, 2016, which claims priority to Finnish Patent Application No. 20155931, filed Dec. 9, 2015, the disclosure of each of these applications is expressly incorporated herein by reference in their entirety.

FIELD

The invention relates to a mixing apparatus for introducing a first liquid, a second liquid, and a third liquid into a process liquid flow which is flowing in a linear flow duct section.

The invention also relates to an arrangement for introducing a first liquid, a second liquid, and a third liquid into a process liquid flow which is flowing in a linear flow duct section.

Publication WO 2014/068185 presents a method of preventing scaling on surfaces of an injection mixing apparatus and an injection mixing apparatus.

Publication SU 1487961 presents a liquid mixer.

SUMMARY

An object is to provide a mixing apparatus and an arrangement for introducing a first liquid, such as liquid chemical, a second liquid, and a third liquid into a process liquid flow which is flowing in a linear flow duct, which mixing apparatus and arrangement provides for mixing of first liquid, such as liquid chemical, a second liquid, and a third liquid into a process liquid flow with small shear forces and turbulence and with high degree of mixing.

Arranging the outlet openings, i.e. the pair of first outlet openings, the second outlet opening, and the pair of third outlet openings, as in the mixing apparatus and in the arrangement provides for optimal mixing of first liquid, second liquid and third liquid into a process liquid flow that is flowing in a linear duct section. Mixing of first liquid, second liquid and third liquid occurs evenly, because the transversal flows from the pair of first outlet openings, the second outlet opening, and the pair of third outlet openings increases dynamic mixing in the linear duct section.

BRIEF DESCRIPTION OF THE DRAWINGS

The mixing apparatus and the arrangement will described in more detail by referring to the figures, which FIG. 28 shows the mixing apparatus shown in FIG. 1 as cut along line M-M in FIG. 27.

DETAILED DESCRIPTION

Figure 1:
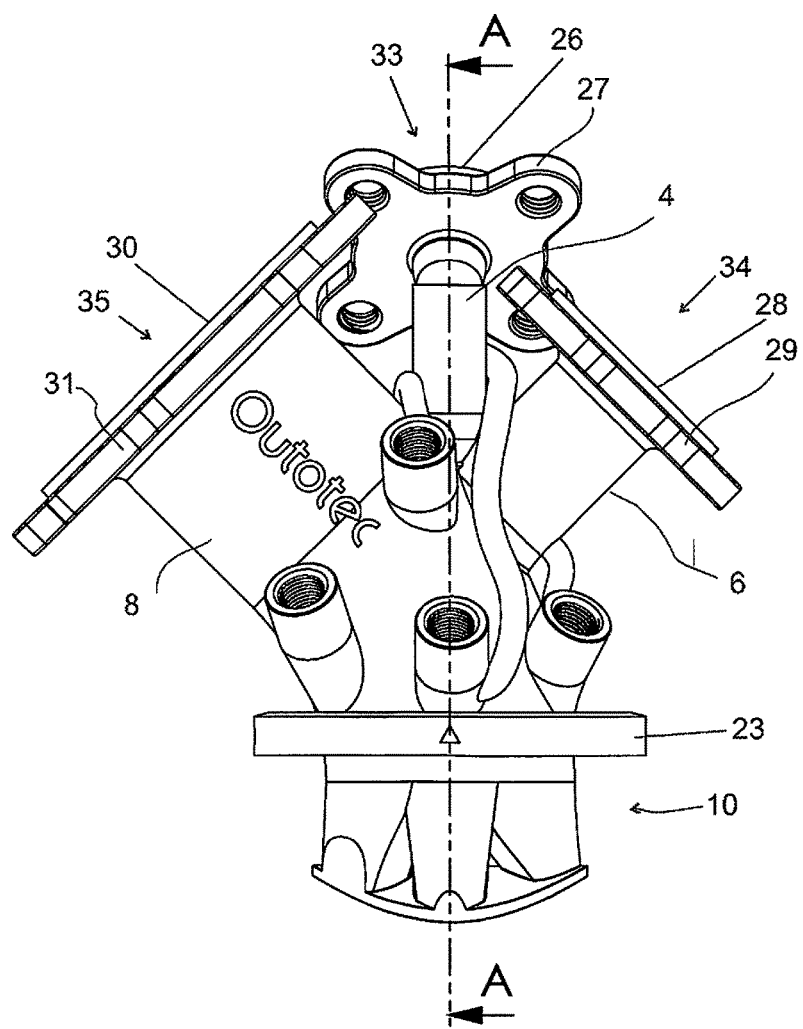
FIG. 1 shows an embodiment of the mixing apparatus according.
Figure 2:
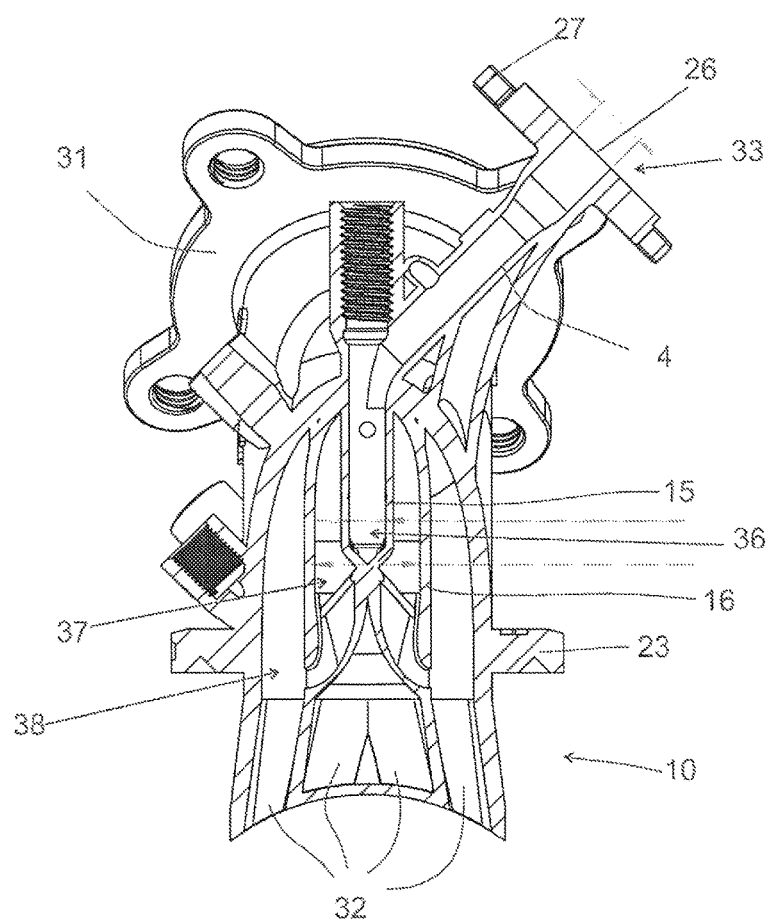
FIG. 2 shows the mixing apparatus shown in FIG. 1 as cut along line A-A in FIG. 1.
Figure 3:
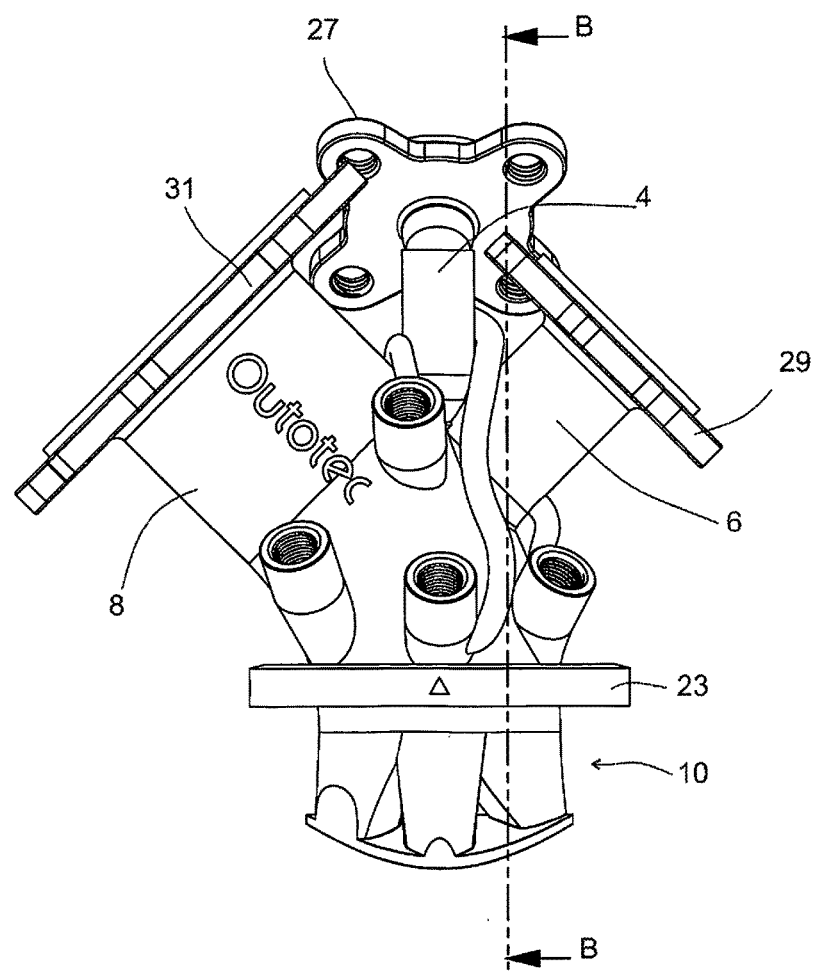
FIG. 3 shows the mixing apparatus shown in FIG. 1 from another angle.
Figure 4:
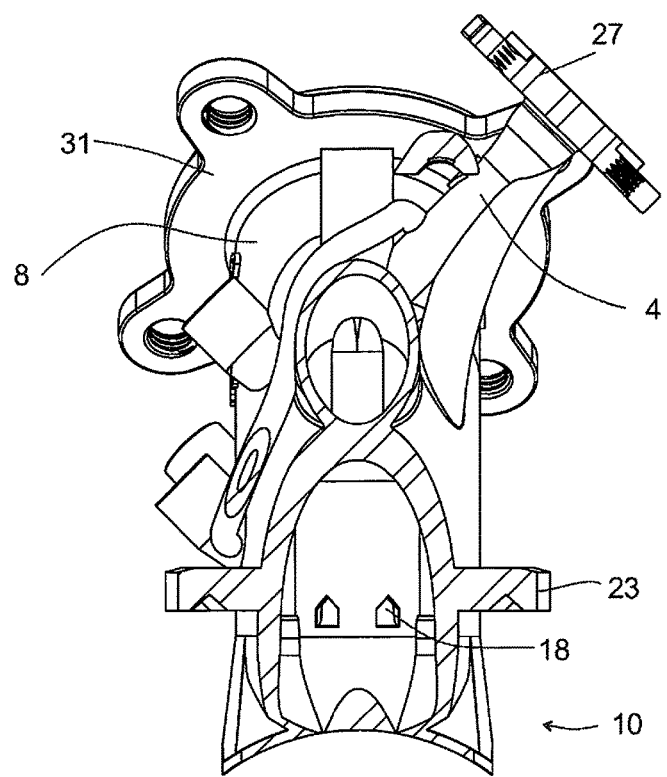
FIG. 4 shows the mixing apparatus shown in FIG. 1 as cut along line B-B in FIG. 3.
Figure 5:
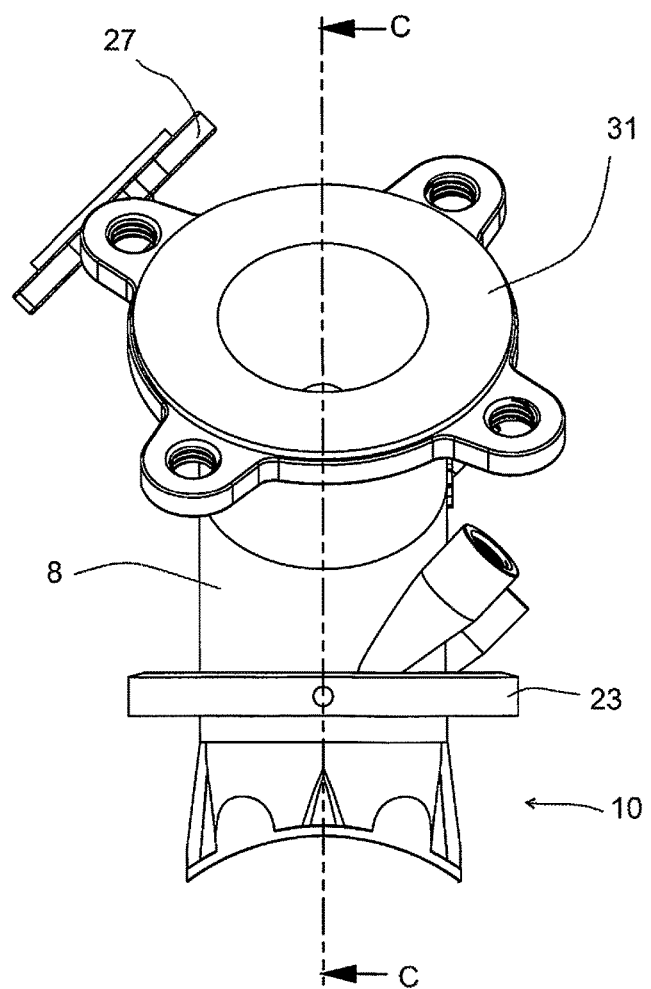
FIG. 5 shows the mixing apparatus shown in FIG. 1 from another angle.
Figure 6:
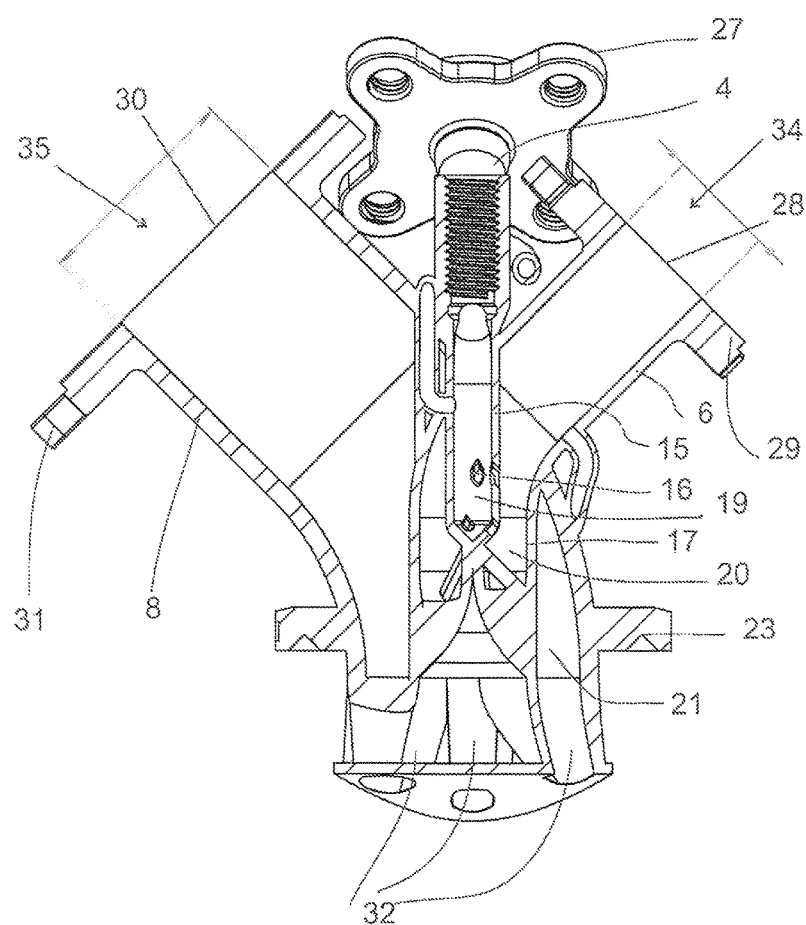
FIG. 6 shows the mixing apparatus shown in FIG. 1 as cut along line C-C in FIG. 5.
Figure 7:
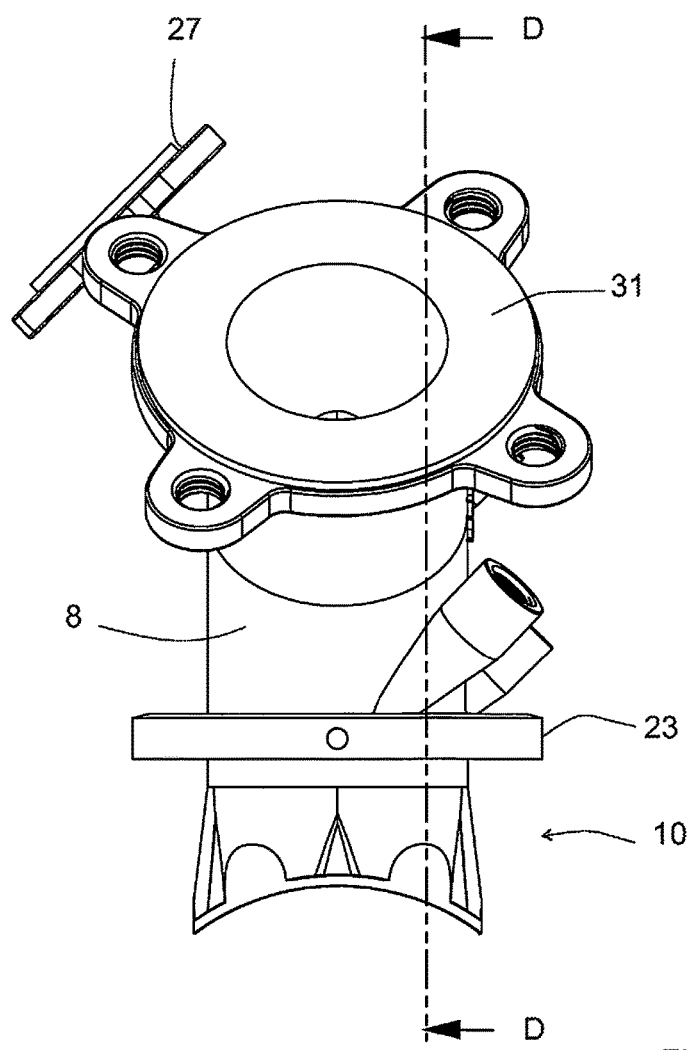
FIG. 7 shows the mixing apparatus shown in FIG. 1 from another angle.
Figure 8:
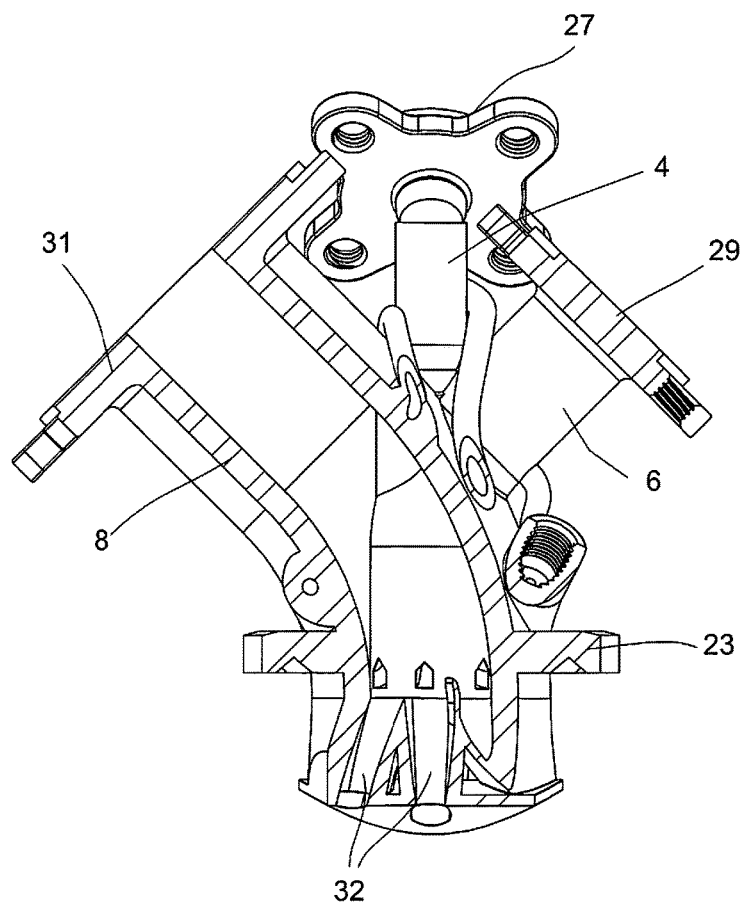
FIG. 8 shows the mixing apparatus shown in FIG. 1 as cut along line D-D in FIG. 7.
Figure 9:
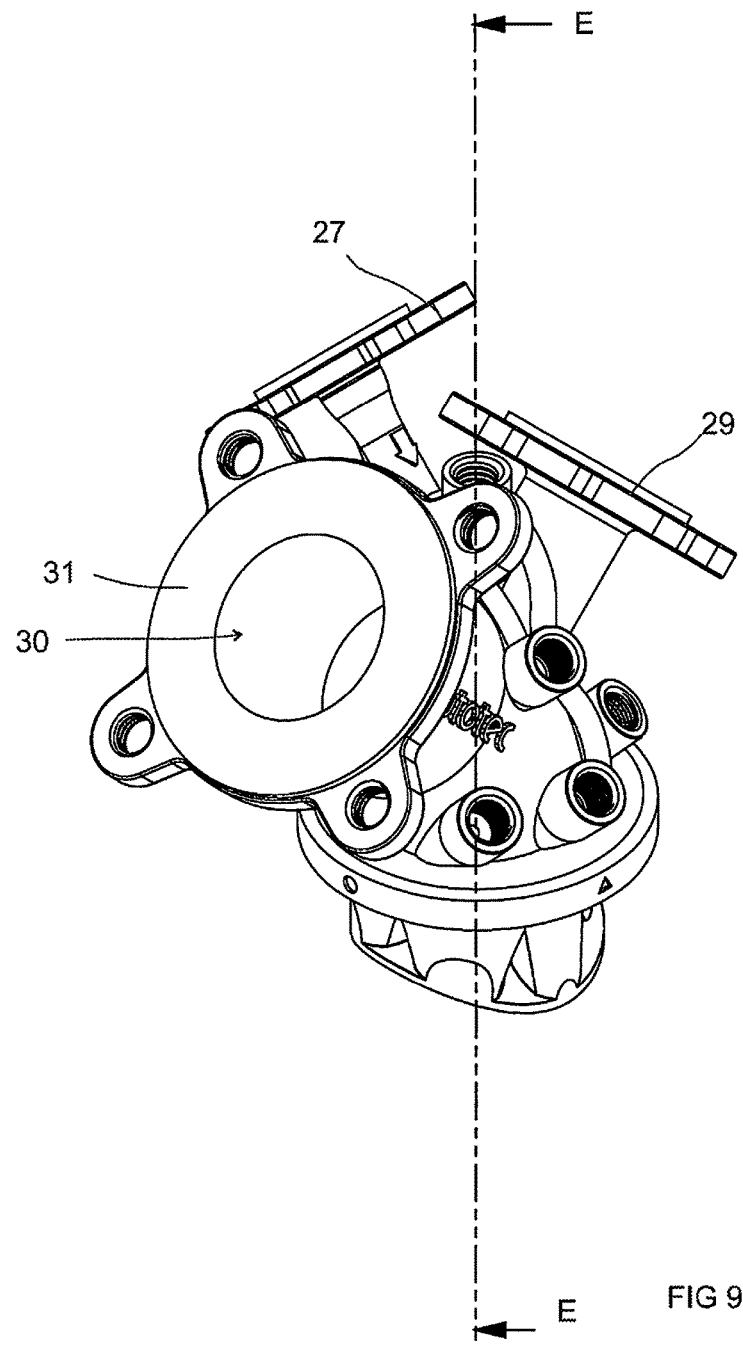
FIG. 9 shows the mixing apparatus shown in FIG. 1 from another angle.
Figure 10:
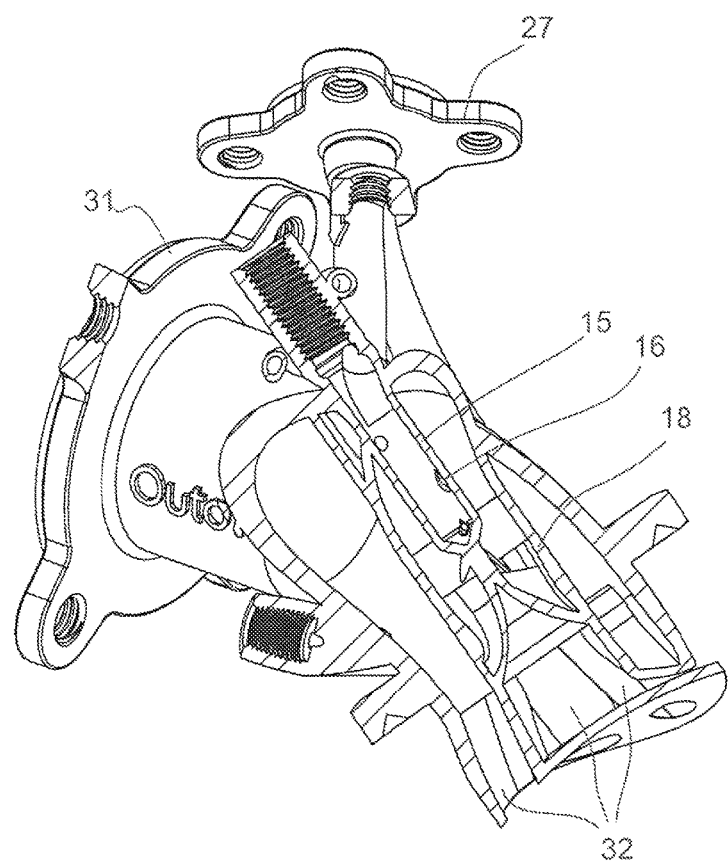
FIG. 10 shows the mixing apparatus shown in FIG. 1 as cut along line E-E in FIG. 9.
Figure 11:
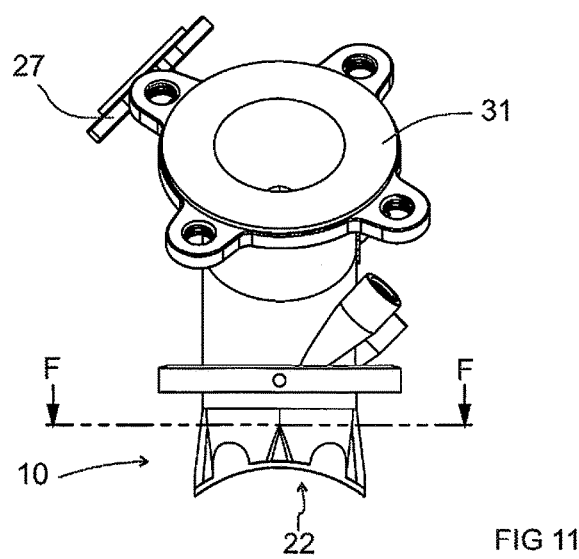
FIG. 11 shows the mixing apparatus shown in FIG. 1 from another angle.
Figure 12:
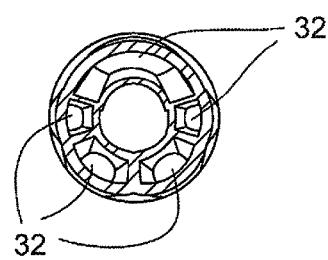
FIG. 12 shows the mixing apparatus shown in FIG. 1 as cut along line F-F in FIG. 11.
Figure 13:
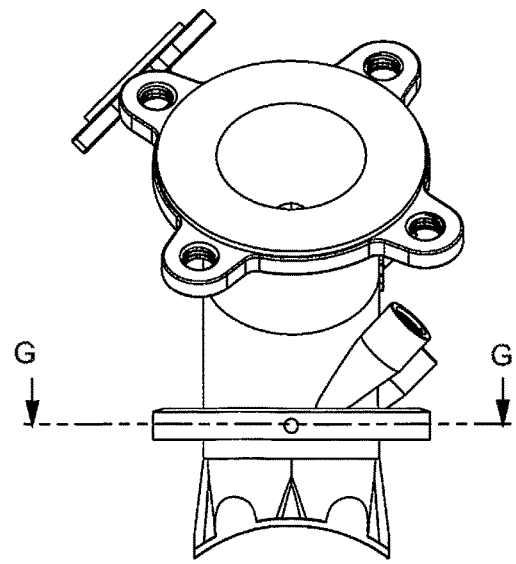
FIG. 13 shows the mixing apparatus shown in FIG. 1 from another angle.
Figure 14:
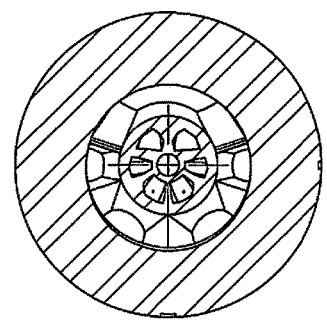
FIG. 14 shows the mixing apparatus shown in FIG. 1 as cut along line G-G in FIG. 13.
Figure 15:
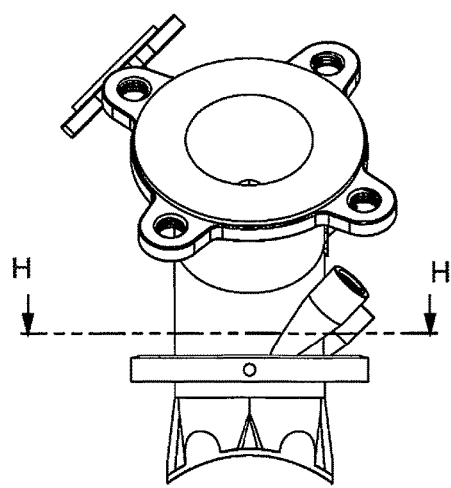
FIG. 15 shows the mixing apparatus shown in FIG. 1 from another angle.
Figure 16:
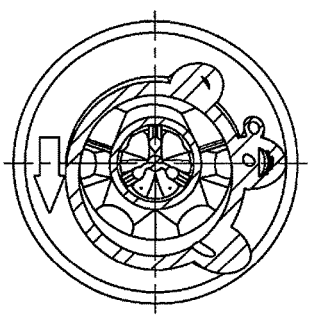
FIG. 16 shows the mixing apparatus shown in FIG. 1 as cut along line H-H in FIG. 15.
Figure 17:
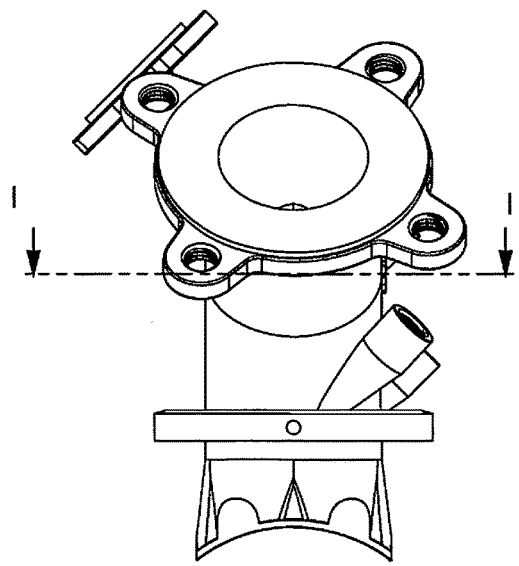
FIG. 17 shows the mixing apparatus shown in FIG. 1 from another angle.
Figure 18:
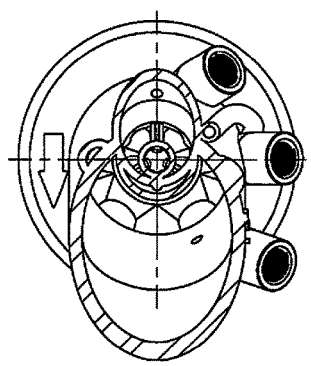
FIG. 18 shows the mixing apparatus shown in FIG. 1 as cut along line I-I in FIG. 17.
Figure 18:
Figure 19:
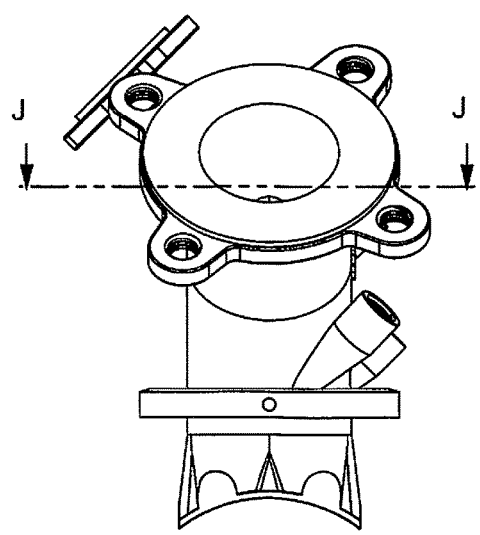
FIG. 19 shows the mixing apparatus shown in FIG. 1 from another angle.
Figure 20:
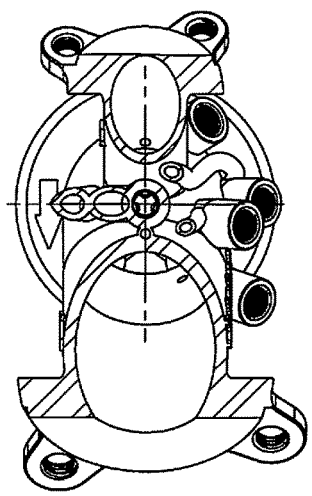
FIG. 20 shows the mixing apparatus shown in FIG. 1 as cut along line J-J in FIG. 19.
Figure 21:
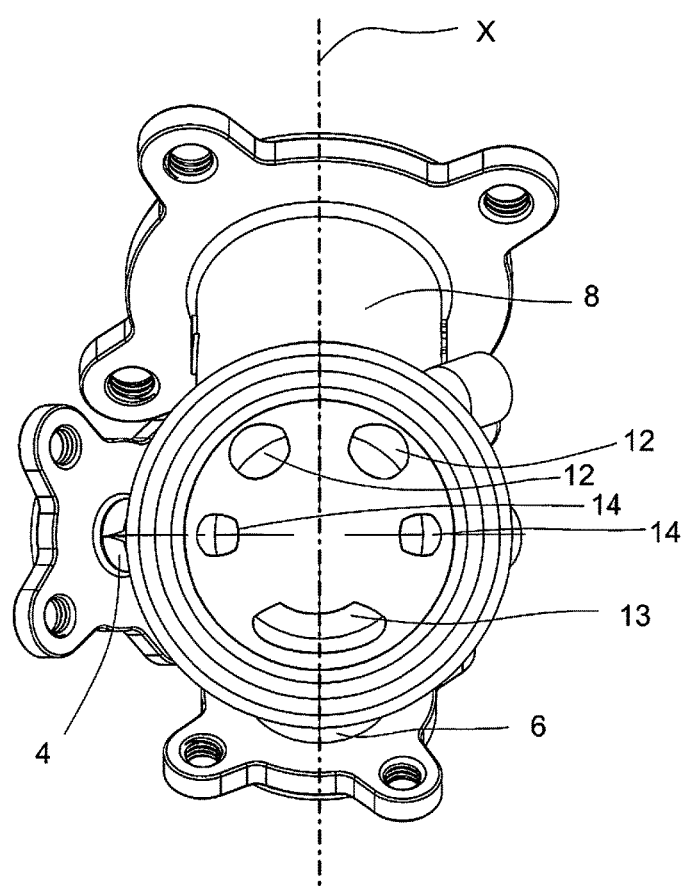
FIG. 21 shows the mixing apparatus shown in FIG. 1 from another angle.
Figure 22:
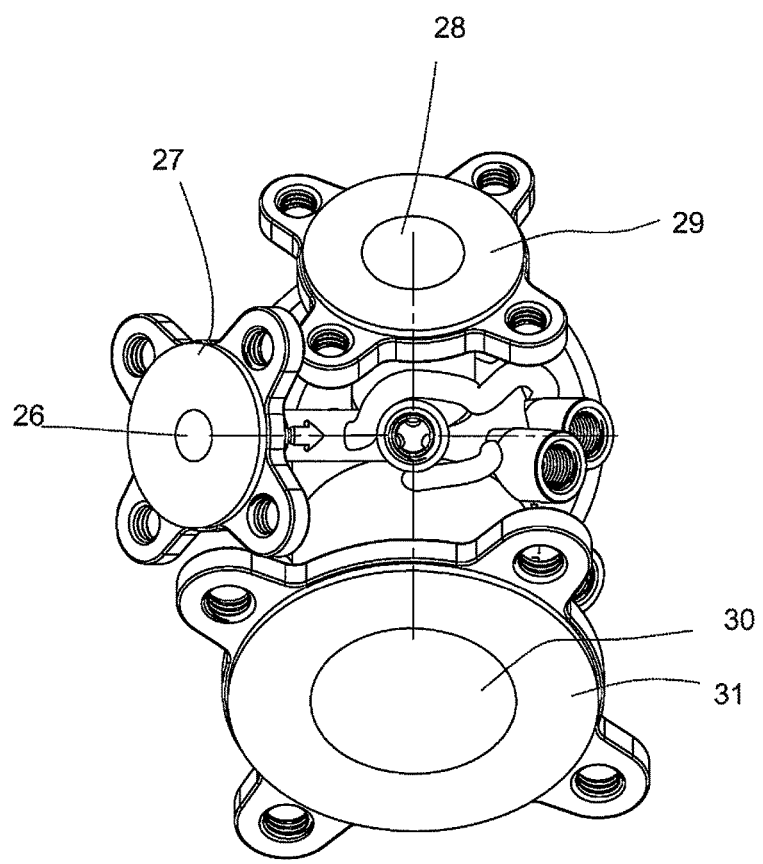
FIG. 22 shows the mixing apparatus shown in FIG. 1 from another angle.
Figure 24:
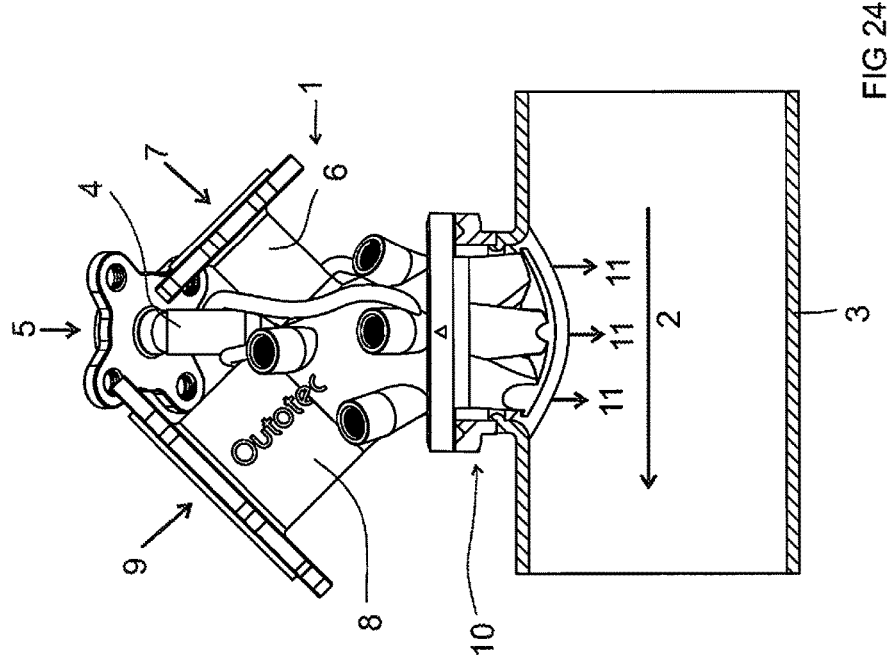
FIG. 24 shows the mixing arrangement shown in FIG. 23 as cut along line K-K in FIG. 23.
Figure 23:
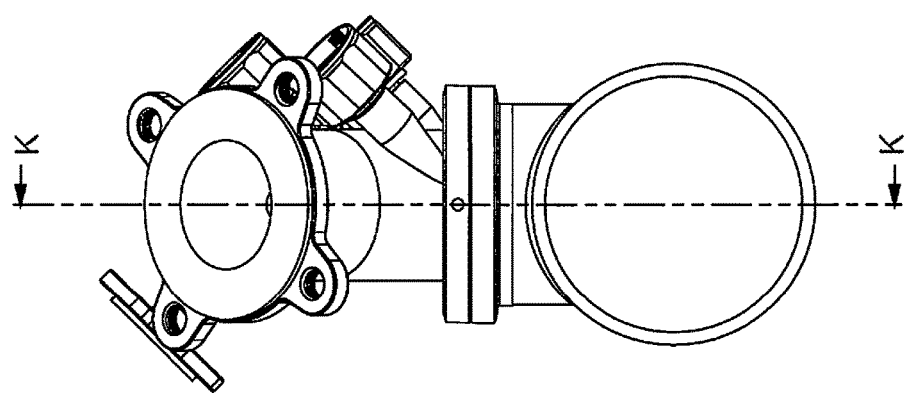
FIG. 23 shows a mixing arrangement comprising the apparatus shown in FIG. 1 and a linear flow duct section.
Figure 26:
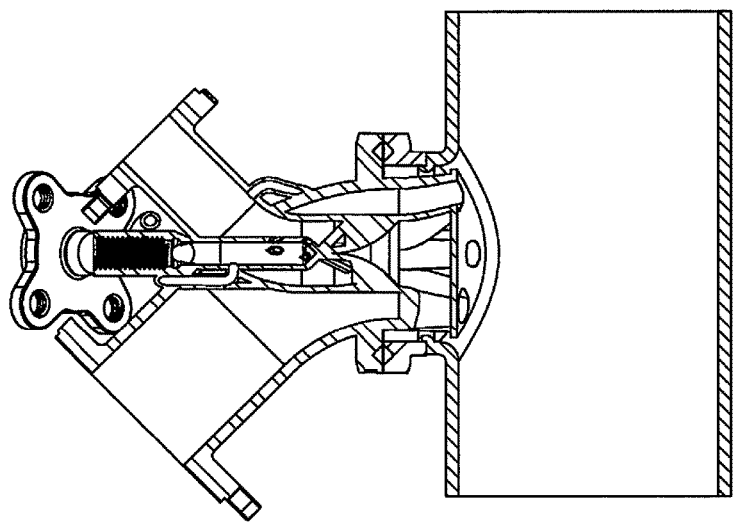
FIG. 26 shows the mixing apparatus shown in FIG. 1 as cut along line L-L in FIG. 25.
Figure 25:
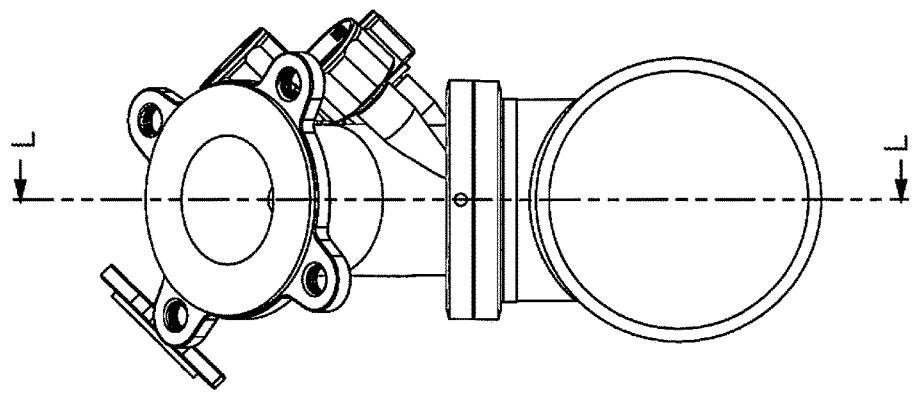
FIG. 25 shows the mixing apparatus shown in FIG. 1 from another angle.
Figure 27:
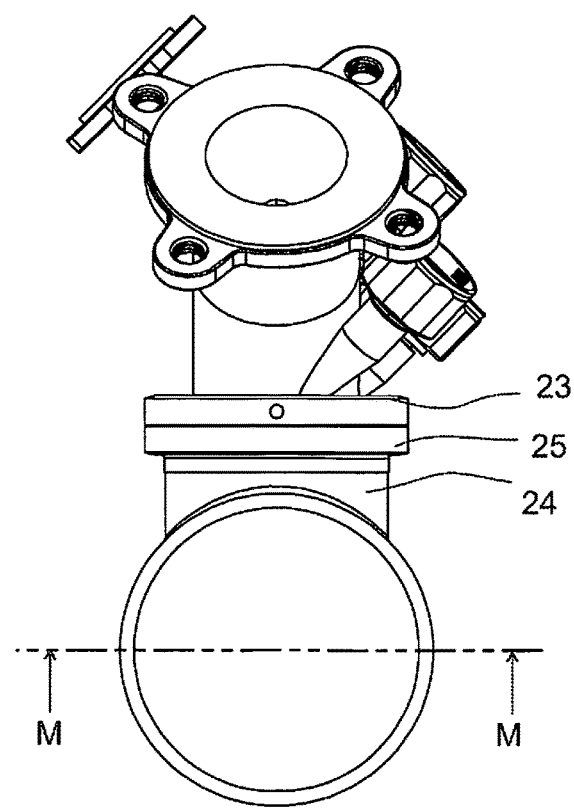
FIG. 27 shows the mixing apparatus shown in FIG. 1 from another angle.

First the mixing apparatus 1 for introducing a first liquid 5, a second liquid 7, and a third liquid 9 into a process liquid flow 2 which is flowing in a linear flow duct section 3 and some embodiments and variants of the mixing apparatus 1 will be described in greater detail.

The mixing apparatus 1 has a first liquid inlet conduit 4 for feeding first liquid 5 such as liquid chemical into the mixing apparatus 1. The first liquid inlet conduit 4 has a first inlet opening 26 at a first upstream end 33 of the first liquid inlet conduit 4 and a first downstream end 36.

The mixing apparatus 1 has a second liquid inlet conduit 6 for feeding second liquid 7 such as dissolvent liquid or dilution liquid or a mixture thereof into the mixing apparatus 1. The second liquid inlet conduit 6 has a second inlet opening 28 at a second upstream end 34 of the second liquid inlet conduit 6 and a second downstream end 37.

The mixing apparatus 1 has a third liquid inlet conduit 8 for feeding third liquid 9 such as dissolvent liquid or dilution liquid or a mixture thereof into the mixing apparatus 1. The third liquid inlet conduit 8 has a third inlet opening 30 at a third upstream end 35 of the third liquid inlet conduit 8 and a third downstream end 38.

The mixing apparatus 1 has an outlet assembly 10 configured to feed mixture 11 of first liquid 5, second liquid 7, and third liquid 9 from the mixing apparatus 1.

The outlet assembly 10 of the mixing apparatus 1 has a pair of identical first outlet openings 12 arranged symmetrically with respect to a center plane X of the outlet assembly 10.

Each first outlet opening 12 is configured to feed mixture 11 of first liquid 5, second liquid 7 and third liquid 9 from the mixing apparatus 1.

The outlet assembly 10 of the mixing apparatus 1 has a second outlet opening 13 arranged at said center plane X of the outlet assembly 10.

Said second outlet opening 13 is configured to feed mixture 11 of first liquid 5, second liquid 7 and third liquid 9 from the mixing apparatus 1.

The outlet assembly 10 of the mixing apparatus 1 has a pair of identical third outlet openings 14 arranged symmetrically with respect to said center plane X of the outlet assembly 10 and along said center plane X of the outlet assembly 10 between said pair of identical first outlet openings 12 and said second outlet opening 13.

Each third outlet opening 14 is configured to feed mixture 11 of first liquid 5, second liquid 7 and third liquid 9 from the mixing apparatus 1.

The mixing apparatus 1 is preferably, but not necessarily, a monolithic structure.

Each first outlet opening 12 may be a quadrilateral with rounded edges and arcuate sides in vertical section.

The second outlet opening 13 may be kidney bean shaped in vertical section.

Each third outlet opening 14 may a quadrilateral with rounded edges and arcuate sides in vertical section.

The cross-section area of each first outlet opening 12 of the pair of first outlet opening 12 is preferably, but not necessarily, larger than cross-section area of each third outlet opening 14 of the pair of third outlet openings 14.

The cross-section area of the second outlet opening 13 is preferably, but not necessarily, being larger than the combined cross-section area of the third outlet openings 14 of the pair of third outlet openings 14.

The first liquid inlet conduit 4 can at the first downstream end 36 of the first liquid inlet conduit 4 open up inside the second liquid inlet conduit 6. The second liquid inlet conduit 6 can at the second downstream end 37 of the second liquid inlet conduit 6 open up inside the third liquid inlet conduit 8.

The second liquid inlet conduit 6 opens preferably, but not necessarily, up inside the third liquid inlet conduit 8, and the first liquid inlet conduit 4 opens preferably, but not necessarily, up inside the second liquid inlet conduit 6, as shown in the embodiment shown in the figures. In such case, the mixing apparatus 1 comprises preferably, but not necessarily, a first cylindrical section 15 between the first liquid inlet conduit 4 opening and third liquid inlet conduit 8, first apertures 16 in the first cylindrical section 14 between the first liquid inlet conduit 4 and the second liquid inlet conduit 6, a second cylindrical section 17 between the third liquid inlet conduit 8 and the second liquid inlet conduit 6, and second apertures 18 in the second cylindrical section 17 between the second liquid inlet conduit 6 and the third liquid inlet conduit 8, as shown in the embodiment shown in the figures. The number of first apertures 16 is preferably, but not necessarily, 3. The first apertures 16 are preferably, but not necessarily asymmetrically disposed in the first cylindrical section 14 between the first liquid inlet conduit 4 and the second liquid inlet conduit 6. The first apertures 16 may have a drop-shaped cross-section. The number of second apertures 18 is preferably, but not necessarily, 3. The second apertures 18 are preferably, but not necessarily asymmetrically disposed in the first cylindrical section 14 between the third liquid inlet conduit 8 and the second liquid inlet conduit 6. The second apertures 18 may have a drop-shaped cross-section. The first liquid inlet conduit 4 comprises preferably, but not necessarily, a third conduit section 19 that is preferably, but not necessarily, co-axial with a second conduit section 20 of the second liquid inlet conduit 6, and the second liquid inlet conduit 6 comprises preferably, but not necessarily, a first conduit section 21 that is preferably, but not necessarily, co-axial with a second conduit section 20 of the third liquid inlet conduit 8.

The outlet assembly 10 comprises preferably, but not necessarily, an arcuate end wall 22 that preferably, but not necessarily, has a circular vertical section.

The mixing apparatus 1 comprises preferably, but not necessarily, a first mounting flange 23.

The second liquid inlet conduit 6 may be at least partly curved and having a circular cross-section. If the second liquid inlet conduit 6 is at least partly curved and having a circular cross-section, the second liquid inlet conduit 6 is preferably, but no necessarily curved between a second connection flange 29 arranged at a second inlet opening 28 of the second liquid inlet conduit 6 and a second cylindrical section 17 of the second liquid inlet conduit 6, as illustrated in the figures.

The third liquid inlet conduit 8 may be at least partly curved and having a circular cross-section.

The first liquid inlet conduit 4 may be at least partly curved and having circular cross-section. If the first liquid inlet conduit 4 is at least partly curved and having a circular cross-section, the first liquid inlet conduit 4 is preferably, but no necessarily curved between a first connection flange 27 arranged at a first inlet opening 26 of the first liquid inlet conduit 4 and a first cylindrical section 15 of the first liquid inlet conduit 4, as illustrated in the figures.

The first liquid inlet conduit 4 of the mixing apparatus 1 has preferably, but not necessarily, a first inlet opening 26 for leading first liquid into the first liquid inlet conduit 4.

The first liquid inlet conduit 4 of the mixing apparatus 1 is preferably, but not necessarily, provided at a first inlet opening 26 with a first connection flange 27.

The second liquid inlet conduit 6 of the mixing apparatus 1 has preferably, but not necessarily, a second inlet opening 28 for leading second liquid into the second liquid inlet conduit 6.

The second liquid inlet conduit 6 of the mixing apparatus 1 is preferably, but not necessarily, provided at a second inlet opening 28 with a second connection flange 29.

The third liquid inlet conduit 8 of the mixing apparatus 1 has preferably, but not necessarily, a third inlet opening 30 for leading third liquid into the third liquid inlet conduit 8.

The third liquid inlet conduit 8 of the mixing apparatus 1 is preferably, but not necessarily, provided at a third inlet opening 30 with a second connection flange 31.

The third liquid inlet conduit 8 may, as in the embodiment shown in the figures, at a third downstream end 38 of the third liquid inlet conduit 8 be in fluid connection with five outlet conduits 32 of the outlet assembly 10, wherein each outlet conduit 32 of the outlet assembly 10 terminating in one of said first outlet openings 12, the second outlet opening 13, and said third outlet openings 14.

Next the arrangement for introducing a first liquid 5, a second liquid 7, and a third liquid 9 into a process liquid flow 2 which is flowing in a linear flow duct section 3 having a circular section and some embodiments and variants of the mixing apparatus 1 will be described in greater detail.

The arrangement comprising a mixing apparatus 1 that is in fluid communication with the linear flow duct section 3.

The mixing apparatus 1 has a first liquid inlet conduit 4 for feeding first liquid 5 such as liquid chemical into the mixing apparatus 1. The first liquid inlet conduit 4 has a first inlet opening 26 at a first upstream end 33 of the first liquid inlet conduit 4 and a first downstream end 36.

The mixing apparatus 1 has a second liquid inlet conduit 6 for feeding second liquid 7 such as dissolvent liquid or dilution liquid or a mixture thereof into the mixing apparatus 1. The second liquid inlet conduit 6 has a second inlet opening 28 at a second upstream end 34 of the second liquid inlet conduit 6 and a second downstream end 37.

The mixing apparatus 1 has a third liquid inlet conduit 8 for feeding third liquid 9 such as dissolvent liquid or dilution liquid or a mixture thereof into the mixing apparatus 1. The third liquid inlet conduit 8 has a third inlet opening 30 at a third upstream end 35 of the third liquid inlet conduit 8 and a third downstream end 38.

The mixing apparatus 1 has an outlet assembly 10 configured to feed mixture 11 of first liquid 5, second liquid 7, and third liquid 9 from the mixing apparatus 1 into the process liquid flow 2 flowing in the linear flow duct section 3.

The outlet assembly 10 of the mixing apparatus 1 has a pair of identical first outlet openings 12 arranged symmetrically with respect to a center plane X of the outlet assembly 10.

Each first outlet opening 12 is configured to feed mixture 11 of first liquid 5, second liquid 7 and third liquid 9 from the mixing apparatus 1 into the linear flow duct section 3 substantially transversely to the process liquid flow 2.

The outlet assembly 10 of the mixing apparatus 1 has a second outlet opening 13 arranged at said center plane X of the outlet assembly 10, upstream of the pair of identical first openings with respect to the process liquid flow 2 in the linear flow duct section 3.

Said second outlet opening 13 is configured to feed mixture 11 of first liquid 5, second liquid 7 and third liquid 9 from the mixing apparatus 1 into the linear flow duct section 3 substantially transversely to the process liquid flow 2, and The outlet assembly 10 of the mixing apparatus 1 has a pair of identical third outlet openings 14 arranged symmetrically with respect to said center plane X and along said center plane X of the outlet assembly 10 between said pair of identical first outlet openings 12 and said second outlet opening 13 with respect to the process liquid flow 2 in the linear flow duct section 3, i.e. upstream of said pair of identical first outlet openings 12 with respect to the process liquid flow 2 in the linear flow duct section 3 and downstream of said second outlet opening 13 with respect to the process liquid flow 2 in the linear flow duct section 3.

Each third outlet opening 14 is configured to feed mixture of first liquid 5, second liquid 7 and third liquid 9 from the mixing apparatus 1 into the linear flow duct section 3 substantially transversely to the process liquid flow 2.

In the arrangement, the center plane X of the outlet assembly 10 is coplanar with a flow duct center plane Y of the linear flow duct section 3.

The mixing apparatus 1 is preferably, but not necessarily, a monolithic structure.

Each first outlet opening 12 of the mixing apparatus 1 may be a quadrilateral with rounded edges and arcuate sides in vertical section.

The second outlet opening 13 of the mixing apparatus 1 may be kidney bean shaped in vertical section.

Each third outlet opening 14 of the mixing apparatus 1 may be a quadrilateral with rounded edges and arcuate sides in vertical section.

In the mixing apparatus 1, the cross-section area of each first outlet opening 12 of the pair of first outlet openings 12 may be larger than cross-section area of each third outlet opening 14 of the pair of third outlet opening 14.

In the mixing apparatus 1, the cross-section area of the second outlet opening 13 being larger than the combined cross-section area of the first outlet openings 12 of the pair of first outlet openings 12.

The first liquid inlet conduit 4 can at the first downstream end 36 of the first liquid inlet conduit 4 open up inside the second liquid inlet conduit 6. The second liquid inlet conduit 6 can at the second downstream end 37 of the second liquid inlet conduit 6 open up inside the third liquid inlet conduit 8.

In the mixing apparatus 1, the second liquid inlet conduit 6 may, as shown in the figures, open up inside the third liquid inlet conduit 8, and the first liquid inlet conduit 4 may open up inside the second liquid inlet conduit 6. In such case, the mixing apparatus 1 may, as shown in the figures, comprise a first cylindrical section 15 between the first liquid inlet conduit 4 opening and third liquid inlet conduit 8, first apertures 16 in the first cylindrical section 15 between the first liquid inlet conduit 4 and the second liquid inlet conduit 6, a second cylindrical section 17 between the third liquid inlet conduit 8 and the second liquid inlet conduit 6, and second apertures 18 in the second cylindrical section 17 between the second liquid inlet conduit 6 and the third liquid inlet conduit 8. The number of first apertures 16 is preferably, but not necessarily, 3. The first apertures 16 are preferably, but not necessarily asymmetrically disposed in the first cylindrical section 14 between the first liquid inlet conduit 4 and the second liquid inlet conduit 6. The first apertures 16 may have a drop-shaped cross-section. The number of second apertures 18 is preferably, but not necessarily, 3. The second apertures 18 are preferably, but not necessarily asymmetrically disposed in the first cylindrical section 14 between the third liquid inlet conduit 8 and the second liquid inlet conduit 6. The second apertures 18 may have a drop-shaped cross-section. The first liquid inlet conduit 4 of the mixing apparatus 1 may comprise a third conduit section 19 that is preferably, but not necessarily, co-axial with a second conduit section 20 of the second liquid inlet conduit 6, and the second liquid inlet conduit 6 may comprise a first conduit section 21 that is preferably, but not necessarily, co-axial with a second conduit section 20 of the third liquid inlet conduit 8.

The outlet assembly 10 of the mixing apparatus 1 comprises preferably, but not necessarily, an arcuate end wall 22 that is symmetrical with respect to the center plane X of the outlet assembly 10. Such arcuate end wall 22 has preferably, but not necessarily, a radius 22 essentially corresponding to the radius of the linear flow duct section 3. Such arcuate end wall 22 has preferably, but not necessarily, has a circular vertical section. The arcuate end wall 22 can have in section the form of and arc having a radius essentially corresponding to the radius of the linear flow duct section 3 having a circular section.

The mixing apparatus 1 comprises preferably, but not necessarily, as shown in the figures, a first mounting flange 23, and the linear flow duct section 3 comprises preferably, but not necessarily, a tee 24 provided with a second mounting flange 25, so that the first mounting flange 23 of the mixing apparatus 1 is connected to the second mounting flange 25 of the tee 24 of the linear flow duct section 3.

The second liquid inlet conduit 6 of the mixing apparatus 1 is preferably, but not necessarily, at least partly curved and having a circular cross-section. If the second liquid inlet conduit 6 is at least partly curved and having a circular cross-section, the second liquid inlet conduit 6 is preferably, but no necessarily curved between a second connection flange 29 arranged at a second inlet opening 28 of the second liquid inlet conduit 6 and a second cylindrical section 17 of the second liquid inlet conduit 6, as illustrated in the figures.

The third liquid inlet conduit 8 of the mixing apparatus 1 is preferably, but not necessarily, to at least partly curved and having a circular cross-section.

The first liquid inlet conduit 4 of the mixing apparatus 1 is preferably, but not necessarily, at least partly curved and having circular cross-section. If the first liquid inlet conduit 4 is at least partly curved and having a circular cross-section, the first liquid inlet conduit 4 is preferably, but no necessarily curved between a first connection flange 27 arranged at a first inlet opening 26 of the first liquid inlet conduit 4 and a first cylindrical section 15 of the first liquid inlet conduit 4, as illustrated in the figures.

The first liquid inlet conduit 4 of the mixing apparatus 1 has preferably, but not necessarily, a first inlet opening 26 for leading first liquid into the first liquid inlet conduit 4.

The first liquid inlet conduit 4 of the mixing apparatus 1 is preferably, but not necessarily, provided at a first inlet opening 26 with a first connection flange 27.

The second liquid inlet conduit 6 of the mixing apparatus 1 has preferably, but not necessarily, a second inlet opening 28 for leading second liquid into the second liquid inlet conduit 6.

The second liquid inlet conduit 6 of the mixing apparatus 1 is preferably, but not necessarily, provided at a second inlet opening 28 with a second connection flange 29.

The third liquid inlet conduit 8 of the mixing apparatus 1 has preferably, but not necessarily, a third inlet opening 30 for leading third liquid into the third liquid inlet conduit 8.

The third liquid inlet conduit 8 of the mixing apparatus 1 is preferably, but not necessarily, provided at a third inlet opening 30 with a second connection flange 31.

The third liquid inlet conduit 8 of the mixing apparatus 1 can at a third downstream end 38 of the third liquid inlet conduit 8 be in fluid connection with five outlet conduits 32 of the outlet assembly 10, wherein each outlet conduit 32 of the outlet assembly 10 terminating in one of said first outlet openings 12, the second outlet opening 13, and said third outlet openings 14.

The mixing apparatus 1 is preferably, but not necessarily, a monolithic structure.

The invention relates also to a method for manufacturing a mixing apparatus 1 according to any embodiment described herein. In the method, the mixing apparatus 1 is at least partly manufactured by an additive manufacturing process.

Below is a table showing some of the possible additive manufacturing processes that can be used:

| Type | Technologies |
| --- | --- |
| Extrusion | Fused deposition modeling (FDM) or fused filament fabrication (FFF) |
|  | Robocasting or direct ink writing |
| Light polymerized | Stereolithography (SLA) |
|  | Digital light processing (DLP) |
| Power bed | Powder bed and inkjet 3D printing (3DP) |
|  | Electron-beam melting (EBM) |
|  | Selective laser melting (SLM) |
|  | Selective heat sintering (SHS) |
|  | Selective laser sintering (SLS) |
|  | Direct metal laser sintering (DLMS) |
| Laminated | Laminated object manufacturing (LOM) |
| Wire | Electron bed freeform fabrication (EBF) |

Possible material to be used in the mixing apparatus are for example carbon steel, steel alloys, any plastic, composites, metal clay including precious metal clay, metal alloy including titanium alloy and cobalt chrome alloy, stainless steel, aluminum, metal matrix composite, and metal foil.

It is apparent to a person skilled in the art that as technology advanced, the basic idea can be implemented in various ways. The mixing apparatus 1, the arrangement, the manufacturing method and their embodiments are therefore not restricted to the above examples, but they may vary within the scope of the claims.

The invention claimed is:

1. A mixing apparatus for introducing a first liquid, a second liquid, and a third liquid into a process liquid flow which is flowing in a linear flow duct section, wherein the mixing apparatus comprises:
    a first liquid inlet conduit for feeding first liquid into the mixing apparatus,
    a second liquid inlet conduit for feeding second liquid into the mixing apparatus,
    a third liquid inlet conduit for feeding third liquid into the mixing apparatus, and
    an outlet assembly configured to feed mixture of first liquid, second liquid, and third liquid from the mixing apparatus, wherein the outlet assembly of the mixing apparatus includes:
    a pair of identical first outlet openings arranged symmetrically with respect to a center plane of the outlet assembly, wherein each first outlet opening is configured to feed mixture of first liquid, second liquid and third liquid from the mixing apparatus,
    a second outlet opening arranged at said center plane, wherein said second outlet opening is configured to feed mixture of first liquid, second liquid and third liquid from the mixing apparatus,
    a pair of identical third outlet openings arranged symmetrically with respect to said center plane and along said center plane of the outlet assembly between said pair of identical first outlet openings and said second outlet opening, wherein each third outlet opening is configured to feed mixture of first liquid, second liquid and third liquid from the mixing apparatus,
    the third liquid inlet conduit being at a third downstream end of the third liquid inlet conduit in fluid connection with five outlet conduits of the outlet assembly, wherein each outlet conduit of the outlet assembly terminating in one of said first outlet openings, the second outlet opening, and said third outlet openings,
    the first liquid inlet conduit has a first inlet opening at a first upstream end of the first liquid inlet conduit and a first downstream end, the second liquid inlet conduit has a second inlet opening at a second upstream end of the second liquid inlet conduit and a second downstream end, the third liquid inlet conduit has a third inlet opening at a third upstream end of the third liquid inlet conduit and a third downstream end, the first liquid inlet conduit at the first downstream end of the first liquid inlet conduit open up inside the second liquid inlet conduit, and the second liquid inlet conduit at the second downstream end of the second liquid inlet conduit open up inside the third liquid inlet conduit.

2. The mixing apparatus according to claim 1, wherein the first outlet opening being a quadrilateral with rounded edges and arcuate sides in vertical section.

3. The mixing apparatus according to claim 1, wherein the second outlet opening is kidney bean shaped in vertical section.

4. The mixing apparatus according to claim 1, wherein the third outlet opening being a quadrilateral with rounded edges and arcuate sides in vertical section.

5. The mixing apparatus according to claim 1, wherein the cross-section area of each third outlet opening of the pair of third outlet opening being larger than cross-section area of each first outlet opening of the pair of first outlet openings.

6. The mixing apparatus according to claim 1, wherein the cross-section area of the second outlet opening being larger than the combined cross-section area of the third outlet openings of the pair of third outlet openings.

7. The mixing apparatus according to claim 1, wherein the second liquid inlet conduit opening up inside the third liquid inlet conduit, and the first liquid inlet conduit opening up inside the second liquid inlet conduit.

8. The mixing apparatus according to claim 7, wherein the first cylindrical section between the first liquid inlet conduit opening and third liquid inlet conduit, first apertures in the first cylindrical section between the first liquid inlet conduit and the second liquid inlet conduit, a second cylindrical section between the third liquid inlet conduit and the second liquid inlet conduit, and second apertures in the second cylindrical section between the second liquid inlet conduit and the third liquid inlet conduit.

9. The mixing apparatus according to claim 7, wherein the first liquid inlet conduit comprises a third conduit section that is co-axial with a second conduit section of the second liquid inlet conduit, and the second liquid inlet conduit comprises a first conduit section that is co-axial with a second conduit section of the third liquid inlet conduit.

10. The mixing apparatus according to claim 1, wherein the outlet assembly comprises an arcuate end wall.

11. The mixing apparatus according to claim 1, further comprising a first mounting flange.

12. The mixing apparatus according to claim 1, wherein the second liquid inlet conduit being at least partly curved and having a circular cross-section.

13. The mixing apparatus according to claim 1, wherein the third liquid inlet conduit being at least partly curved and having a circular cross-section.

14. The mixing apparatus according to claim 1, wherein the first liquid inlet conduit being at least partly curved and having circular cross-section.

15. An arrangement for introducing a first liquid, a second liquid, and a third liquid into a process liquid flow which is flowing in a linear flow duct section having a circular section, wherein the arrangement comprising a mixing apparatus according to claim 1 that is in fluid communication with the linear flow duct section, wherein the outlet assembly of the mixing apparatus is configured to feed mixture of first liquid, second liquid, and third liquid from the mixing apparatus into the process liquid flow flowing in the linear flow duct section, wherein first outlet opening in said pair of identical first outlet openings of the outlet assembly of the mixing apparatus is configured to feed mixture of first liquid, second liquid and third liquid from the mixing apparatus into the linear flow duct section substantially transversely to the process liquid flow, the second outlet opening of the outlet assembly of the mixing apparatus is arranged upstream of the pair of said pair of identical first openings with respect to the process liquid flow in the linear flow duct section, wherein said second outlet opening is configured to feed mixture of first liquid, second liquid and third liquid from the mixing apparatus into the linear flow duct section substantially transversely to the process liquid flow, and said pair of identical third outlet openings of the outlet assembly of the mixing apparatus are arranged between said pair of identical first outlet openings and said second outlet opening with respect to the process liquid flow in the linear flow duct section, wherein each third outlet opening of said pair of identical third outlet openings of the outlet assembly is configured to feed mixture of first liquid, second liquid and third liquid from the mixing apparatus into the linear flow duct section substantially transversely to the process liquid flow, and the center plane of the outlet assembly of the mixing apparatus being coplanar with a flow duct center plane of the linear flow duct section.

* * * * *